United States Patent [19]
Gray et al.

[11] Patent Number: 5,810,908
[45] Date of Patent: Sep. 22, 1998

[54] ELECTRONIC CONTROL FOR AIR FILTERING APPARATUS

[75] Inventors: Edward G. Gray, Rowlett, Tex.; John W. Seaman, Sheboygan Falls, Wis.

[73] Assignee: Bemis Manufacturing Company, Sheboygan Falls, Wis.

[21] Appl. No.: 850,064

[22] Filed: May 2, 1997

[51] Int. Cl.$^6$ .................................................. B01D 46/46
[52] U.S. Cl. .......................... 95/25; 55/DIG. 34; 96/397; 96/417
[58] Field of Search .................................. 95/25, 6, 7, 19; 55/274, DIG. 34, 210, 212; 96/397, 417

[56] References Cited

U.S. PATENT DOCUMENTS

| D. 310,412 | 9/1990 | Fukumoto et al. | D23/359 |
|---|---|---|---|
| D. 323,210 | 1/1992 | Wortham | D23/364 |
| D. 328,637 | 8/1992 | Muller et al. | D23/364 |
| D. 343,677 | 1/1994 | Gyori et al. | D23/364 |
| D. 344,791 | 3/1994 | Cunning | D23/364 |
| D. 349,566 | 8/1994 | O'Grady | D23/364 |
| D. 350,191 | 8/1994 | Tsuji | D23/364 |
| D. 377,523 | 1/1997 | Marvin et al. | D23/364 |
| 2,715,452 | 8/1955 | Kent | 183/37 |
| 2,853,155 | 9/1958 | Peter | 55/DIG. 34 |
| 3,232,030 | 2/1966 | Owenmark | 55/217 |
| 4,894,071 | 1/1990 | Klein | 55/97 |
| 5,461,368 | 10/1995 | Comer | 55/274 |

FOREIGN PATENT DOCUMENTS

| 59-122829 | 7/1984 | Japan | 55/274 |
|---|---|---|---|
| 0147211 | 8/1985 | Japan . | |
| 0147212 | 8/1985 | Japan . | |
| 60-147210 | 8/1985 | Japan | 55/274 |
| 60-147213 | 8/1985 | Japan | 55/274 |
| 404219110 | 8/1992 | Japan . | |
| 405076713 | 2/1993 | Japan . | |
| 5-154323 | 6/1993 | Japan | 95/25 |

*Primary Examiner*—Duane S. Smith
*Attorney, Agent, or Firm*—Michael Best & Friedrich

[57] ABSTRACT

An air filtering apparatus including motor selectively connected to a power source, a fan driven by the motor and creating an air flow, a replaceable filter element selectively positioned in the air flow path, and an electronic control. The electronic control includes a clogged filter element detector and an indicator and a missing filter element detector. The current drawn by the fan motor is sensed by a current transformer and compared to a predetermined threshold by a comparator in each detector. If the current drawn by the fan motor is less than the clogged filter element predetermined threshold, the clogged filter element detector operates an indicator. If the current drawn by the fan motor is greater than the missing filter element predetermined threshold, the missing filter element detector operates a controller to disconnect the fan motor from the power source.

20 Claims, 3 Drawing Sheets

ELECTRONIC CONTROL FOR AIR FILTERING APPARATUS

BACKGROUND OF THE INVENTION

This invention relates to air filtering apparatus, and more particularly, to an electronic control for an air filtering apparatus.

An air filtering apparatus generally filters airborne particulates such as dust, pollen, smoke, bacteria and viruses from the air in a room in order to improve or maintain the air quality in the room. A typical air filtering apparatus includes a housing having an air inlet and an air outlet. The housing defines an air flow path between the air inlet and the air outlet. Commonly known air filtering apparatus also include an electric motor, a fan powered by the electric motor to drive air through the air flow path, and a replaceable filter element constructed of a filter media and placed in the air flow path to filter particulates from the air flowing through the air flow path.

Typically, the motor has several operating speeds, e.g., "HI", "MEDIUM", and "LOW". At each selected operating speed, the motor causes the fan to rotate at a set speed (measured in revolutions per minute (rpm)).

The effectiveness of an air filtering apparatus varies depending upon the type of filter element used. Moreover, a given air filtering apparatus can use multiple filter elements and can use multiple filter elements of different types.

The available filter element types range from those with less dense filter media to those with more dense filter media. The more dense filter media filter out smaller particulates and provide increased air purification. As a result, more dense filter elements become clogged with particulates quicker than less dense filter elements, and air flow through the more dense filter elements is therefore obstructed quicker.

One of the more dense filter media is the High Efficiency Particulate Air or "HEPA" filter element. The HEPA filter element operates to filter a greater percentage of airborne particulates from the air. Even relatively small particulates are collected by the HEPA filter element. As explained above, however, when the HEPA filter element becomes clogged, the air flow through the HEPA filter element is greatly diminished.

Also, it is commonly known that if a less dense filter media is clogged, air continues to flow though the openings in the less dense filter media. However, when a more dense filter element is clogged, air flow through the filter element is greatly reduced and may even be stopped completely.

Because the purpose of the air filtering apparatus is to filter airborne particulates from the air and thus ensure air quality, an important feature of the air filtering apparatus control is determining when the filter element is clogged and is no longer effective. At this point, the operator needs to change the filter element.

There are several types of existing devices which indicate when the filter element needs to be replaced. One type of indicator senses a pressure drop across the filter element. The pressure drop is created because the filter element, even one that is made of a less dense filter media, impedes some air flow. The pressure drop is greater for a filter element with the more dense filter media and increases as the filter element becomes clogged. This type of indicator typically uses one or more pressure sensors to sense and compare the inlet and outlet pressures of the system. If the difference or pressure drop is above a given amount, the sensor indicates that the filter element is clogged and should be changed.

SUMMARY OF THE INVENTION

It has been found that the mechanical load on and the electrical current consumption of the fan motor are directly related to the amount of air flow effected by the fan. For a given operating speed, the fan creates a maximum air flow, and therefore maximum mechanical load and maximum electrical current consumption if there is no filter element in the air flow path. In some constructions using a smaller motor, the resulting high current causes the motor to get hot. This heat can cause the thermal protector of the motor to trip.

Additionally, once a new filter element is in place in the air flow path, the density of the filter element increases as the filter element begins to collect particulates. As a result, the air flow from the air inlet to the air outlet begins to decrease as the new filter element collects particulates. Eventually, air flow through the filter element reaches a minimum or stops completely as the filter element becomes clogged. Because there is no air flow, the mechanical load on the motor is at a minimum and the current drawn by the motor is also at a minimum.

Accordingly, the invention provides an electronic control circuit for an air filtering apparatus that cuts off current flow to the motor if the current exceeds a predetermined value. If the motor current exceeds a predetermined value, then it can be assumed that there is no filter element in the air flow path.

The invention also provides an electronic control circuit for detecting a clogged filter element condition by monitoring the electrical current drawn by the motor to establish when the electrical current drops below a predetermined set point.

An advantage of the air filtering apparatus of the present invention is that the control senses when the filter element is clogged to provide an indication of when the filter element needs to be replaced. This ensures that the air filtering apparatus will operate effectively to filter the air.

Another advantage of the air filtering apparatus of the present invention is that the electronic control senses when the filter element is not installed and shuts down the motor to prevent switching of the thermal protector of the motor. This also ensures that the air filtering apparatus operates with a filter element in place so that it filters the air effectively.

Other features and advantages of the invention will become apparent to those skilled in the art upon review of the following detailed description, claims and drawings.

Figure 1:
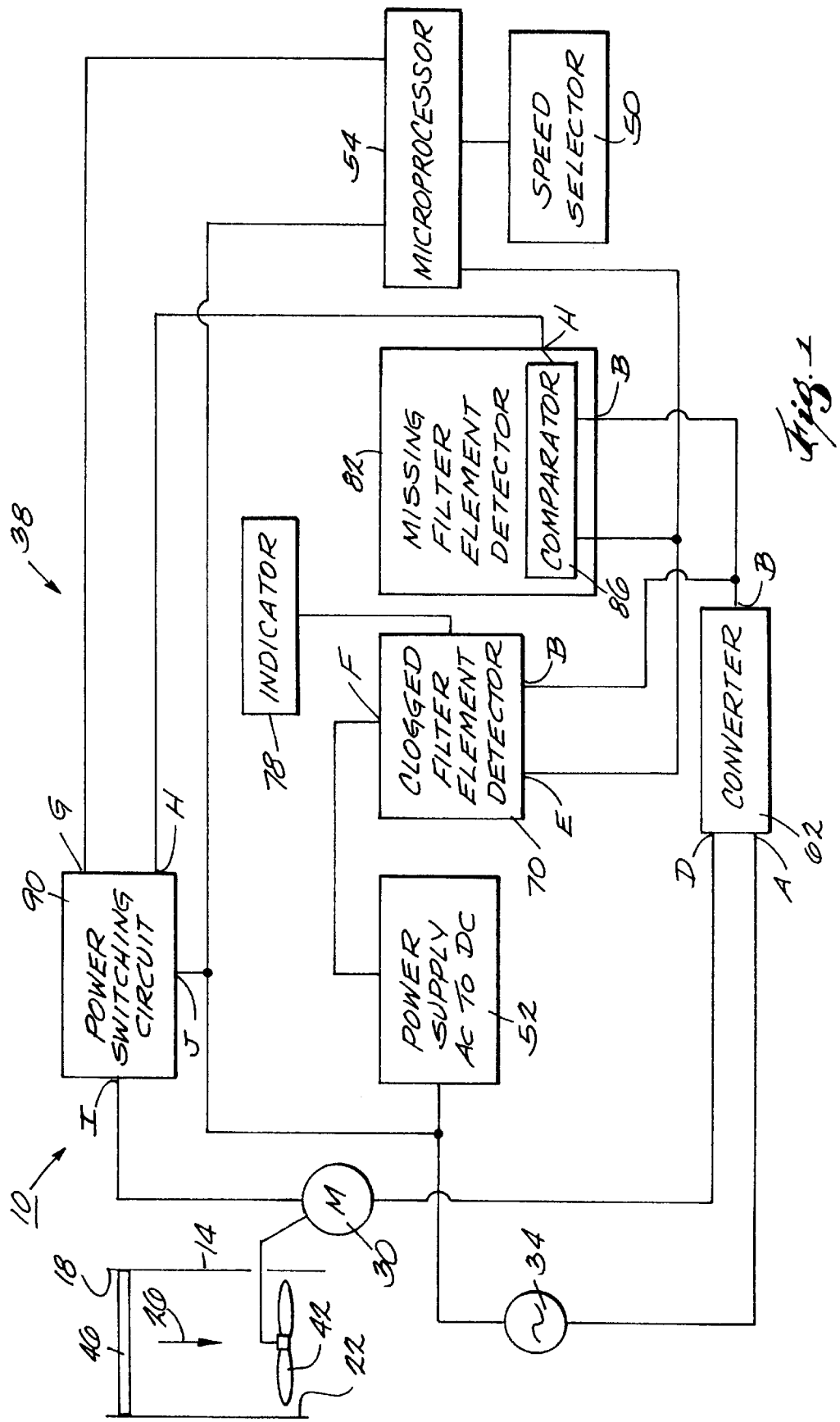
FIG. 1 is a schematic block diagram of an air filtering apparatus embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting.

DETAILED DESCRIPTION OF THE PREFERRED EMBODIMENT

An air purifier or air filtering apparatus 10 embodying the invention is schematically illustrated in FIG. 1. Generally, the air filtering apparatus 10 includes a housing 14 having an air inlet 18 and an air outlet 22. The housing 14 defines an airflow path 26 from the inlet 18 to the outlet 22. The air filtering apparatus also includes an electric motor 30 supported by the housing 14. The motor 30 is conventional and, therefore, includes a thermal protector switch (not shown). The protector switch will generally trip to prevent damage to the motor 30 if the motor 30 becomes overheated. The motor 30 is selectively connected to a conventional power source 34 by an electronic control or controller circuit 38, as explained below in greater detail.

The air filtering apparatus 10 further includes an air flow producing element or fan 42 also supported by the housing 14. The fan 42 is driven by the motor 30 to produce an air flow in the air flow path 26. The fan 42 may be any type of air flow producing element known in the art.

The air filtering apparatus 10 also includes a filter element 46 removably positioned in the air flow path 26. The filter element 46 filters airborne particulates such as dust, pollen, smoke, bacteria and viruses from the air flow produced by the fan 42. In the illustrated construction, the filter element 46 is constructed of a relatively dense filter media and is a High Efficiency Particulate Air or "HEPA" filter element. In other constructions, however, the filter element 46 may be constructed of a relatively less dense filter media.

As discussed above, the HEPA filter element 46 filters a greater percentage of airborne particulates from the air providing increased air purification. When the HEPA filter element 46 becomes clogged, however, the air flow through the HEPA filter element 46 and through the air flow path 26 is greatly diminished and may even be stopped completely.

In the illustrated construction, the air filtering apparatus 10 includes one filter element 46 positioned upstream of the fan 42 so that the fan 42 draws air through the filter element 46. In other constructions, however, the air filtering apparatus 10 can employ multiple filter elements and can use filter elements of different types. Also, the filter element(s) 46 may be positioned downstream from the fan 42 so that the fan 42 forces air through the filter element(s) 46.

The controller circuit 38 includes a speed selector element or circuit 50. The speed selector 50 includes a series of switches (not shown) for selectively connecting the motor 30 to the power source 34 and for setting the output voltage at which the motor 30 operates. At a given output voltage, the motor 30 drives the fan 42 to rotate at a set operating speed (measured in revolutions per minute (rpm)). At the selected output voltage and operating speed, the fan 42 will generally rotate at the set operating speed.

Figure 2:
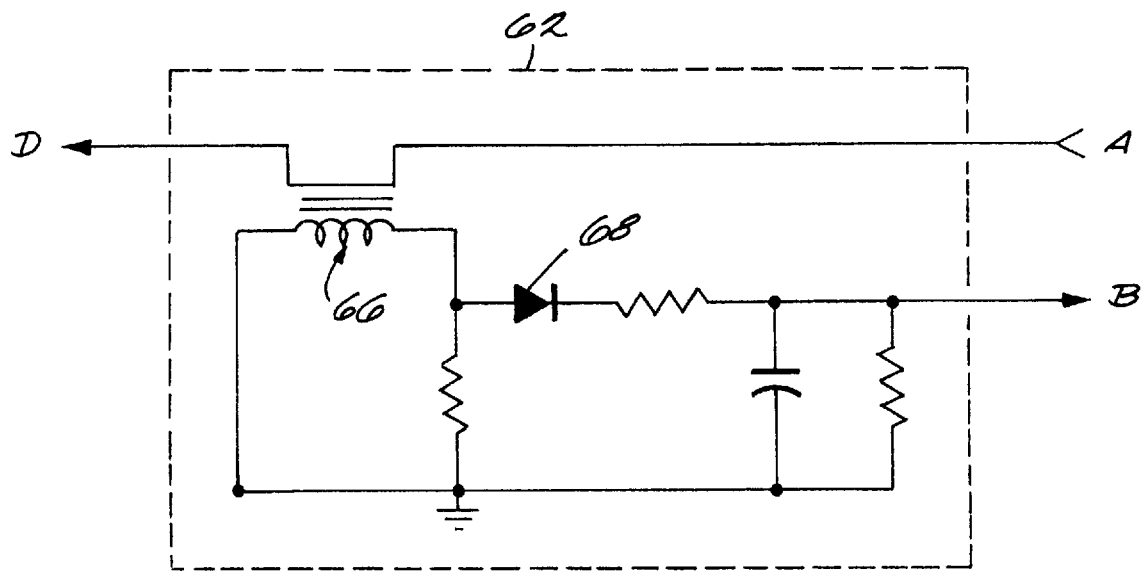
FIG. 2 is a schematic diagram of the converter shown in FIG. 1.

The motor 30 is connected to the power source 34 via the controller circuit 38 which includes an AC to DC power supply 52. The power supply 52 is conventional and is connected to the various components of the controller circuit 38 to provide positive d.c. supply voltage (not shown) and ground return (FIGS. 2 and 3 only) for the controller circuit 38. As is commonly known in the art, the positive d.c. supply voltage and the ground return are connected to the controller circuit components as required.

In the illustrated construction, the speed selector switches correspond to the following operating states for the motor 30 and the fan 42: (1) "OFF" in which the motor 30 is disconnected from the power source 34 and does not drive the fan 42; (2) "LOW" in which a relatively low output voltage and a relatively low speed are set; (3) "HI" in which the highest output voltage and the highest speed are set; and (4) "MEDIUM" in which a moderate output voltage and corresponding moderate speed are set.

The controller circuit 38 also includes a microprocessor 54 connected to the power supply 52 and to the speed selector 50. The speed selector 50 signals the microprocessor 54 when the speed control 50 is set to "HI". The microprocessor 54 produces a signal in response to the "HI" setting. In other constructions, the speed selector 50 and the microprocessor 54 may signal when the speed control 50 is in another setting.

The controller circuit 38 also includes a converter 62 connected to the power supply 52. The converter 62 converts the current drawn by the motor 30 into an electrical signal indicative of the current, such as a voltage signal. As shown in detail in FIG. 2, the converter 62 includes a sensing element which, in the illustrated construction, is a current transformer 66. The current transformer 66 senses the current supplied to the motor 30 and generates a voltage signal in response to the sensed current. The voltage signal is rectified by diode 68 and output at node B.

Figure 3:
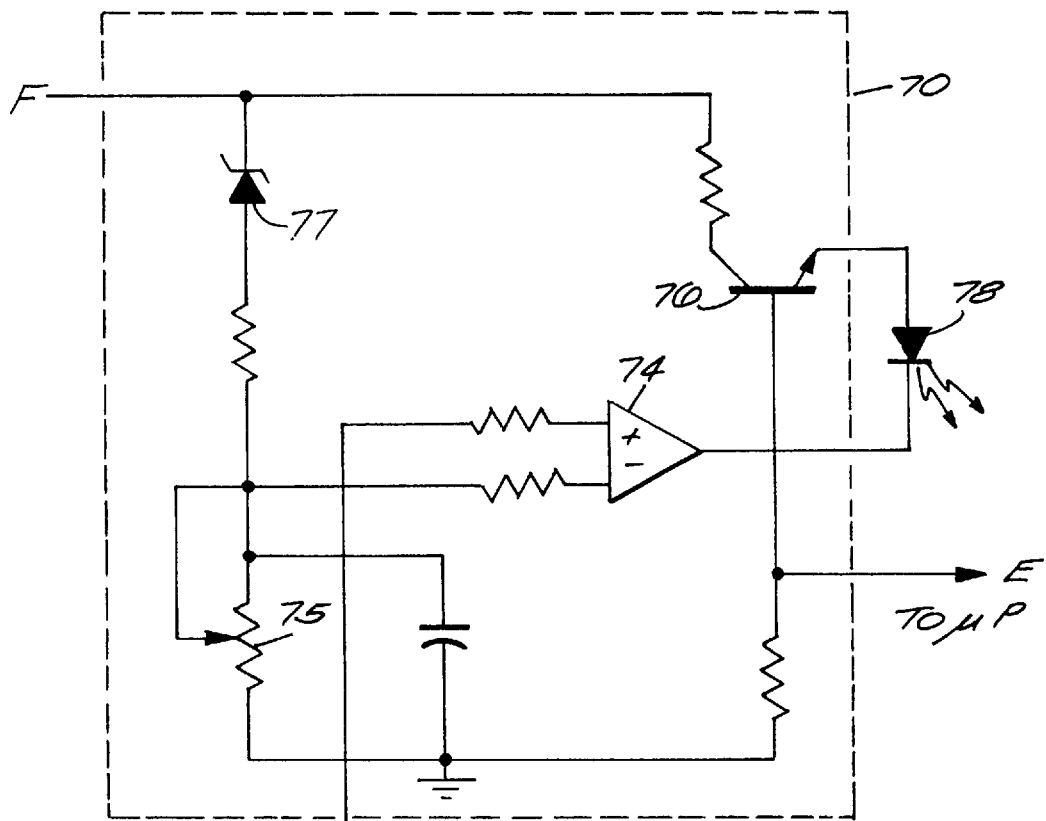
FIG. 3 is a schematic diagram of the clogged filter element detector and the indicator shown in FIG. 1.

The controller circuit 38 further includes a clogged filter element detector 70. As shown in detail in FIG. 3, the clogged filter element detector 70 includes a comparator 74, a variable resistor 75, and a transistor 76. The non-inverting input of the comparator 74 is connected to the output of the current transformer 66 via node B. The inverting input of the comparator 74 is connected to the variable resistor 75. The voltage output from the current transformer 66 is compared to the voltage across the variable resistor 75, which is set to a threshold representing a clogged filter condition. The output of the comparator 74 is connected to the emitter of the transistor 76 through an indicator 78. The base of the transistor 76 is also connected to the microprocessor 54. As shown in FIG. 3, the indicator 78 is a light emitting diode. However, any appropriate visible or audible indicator may be used.

In the normal state of the comparator 74, the comparator 74 inhibits current flow through the transistor 76. This is because the output voltage of the comparator 74 is in a high state (e.g. 12 volts). Under an abnormal condition, such as that in which the signal B is less than the predetermined threshold set by the variable resistor 75, the comparator 74 changes to a state in which the output voltage is low (e.g. 0.0 volts) and allows current to flow through the transistor 76.

The clogged filter element detector 70 also includes a zener diode 77. The zener diode 77 is connected to the power supply 52 via node F to provide input compensation to the clogged filter element detector 70. The input compensation enables the predetermined threshold to be varied with line voltage fluctuations.

If the line voltage is less than normal 120 volts, the current through the motor 30 will also be less than normal. The output from the diode 77 will adjust the threshold voltage to ensure that the predetermined threshold is also set to a corresponding lower value. This compensation prevents a false indication which might result merely from the voltage fluctuation of the power source 34.

Similarly, if the line voltage is greater than normal 120 volts, the current through the motor 30 will also be higher than normal. The output from the diode 77 will adjust the threshold voltage to ensure that the predetermined threshold is also set to a corresponding higher value. This compensation prevents the clogged filter element detector 70 and the indicator 78 from indicating that the filter element 46 is clogged merely because of the increased current through the motor 30.

The controller circuit 38 further includes a missing filter element detector 82. The missing filter element detector 82 includes a comparator 86. Like the comparator 74, the comparator 86 is a commonly known operational amplifier comparator. The inverting input of the comparator 86 is connected to the output B of the current transformer 66. The non-inverting input of the comparator 86 is connected to a resistive voltage divider network (not shown). The network sets the missing filter element predetermined threshold to which the output B from the current transformer 66 is compared. Normally, the comparator 86 outputs a signal H.

Figure 4:
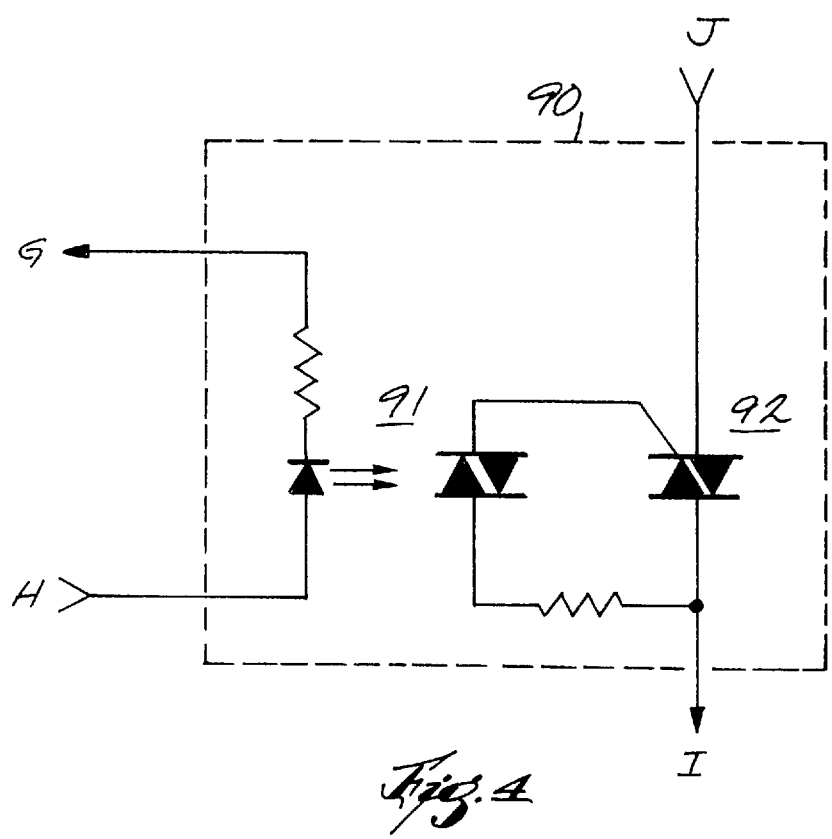
FIG. 4 is a schematic diagram of the power switching circuit shown in FIG. 1.

In the normal state of the comparator 86, the comparator 86 is on to generate a positive voltage signal at node H. Under an abnormal condition, such as that in which the signal B is greater than the predetermined threshold set by the resistive voltage divider network, the comparator 86 turns off, i.e. the signal at node H is 0.0 volts The controller circuit 38 also includes a controller or a power switching circuit 90 selectively connecting the motor 30 to the power supply 52. The input of the power switching circuit 90 is connected to the comparator 86 via node H. As shown in detail in FIG. 4, the power switching circuit 90 includes an opto-coupler 91 and a triac 92. The triac 92 disconnects the motor 30 from the power source 34 via node I in response to the stopping of signal H from the comparator 86. In other embodiments, the power switching circuit 90 can be replaced with any appropriate relay circuit or other type of switching circuit.

In operation, the air filtering apparatus 10 is connected to the power source 34 in a conventional manner. The filter element 46 may be positioned in the air flow path 26. From the "OFF" condition, the user selects one of the operating speed switches of the speed selector 50. The chosen speed selector switch sets the output voltage for the motor 30 and operating speed for the fan 42 and connects the motor 30 to the power source 34. The motor 30 drives the fan 42 to create an air flow in the air flow path 26. If the selected speed is "HI", the elements of the controller circuit 38 operate to determine if (1) the filter element 46 is positioned in the air flow path 26, and (2) the filter element 46 is clogged.

If the speed selector element is set to "HI", the microprocessor 54 receives this signal from the speed selector 50 and outputs the corresponding signal to the transistor 76 of the clogged filter element detector 70 and to the comparator 86 of the missing filter element detector 82.

The current transformer 66 senses the current that is being supplied to the motor 30. The current transformer 66 generates the output voltage B indicative of the current supplied to the motor 30. This output B is provided to the comparators 74 and 86.

The mechanical load on and the electrical consumption of the motor 30 are directly related to the amount of air flow effected by the fan 42. For a given operating speed, the fan 42 creates a maximum air flow, and therefore a maximum mechanical load and a maximum electrical current consumption if there is no filter element 46 in the air flow path 26. In the illustrated construction, the resulting high current causes the motor 30 to get hot. This heat can cause the thermal protector of the motor 30 to trip.

Assuming that the speed selector 50 is set to "HI", the comparator 86 of the missing filter element detector 82 compares the signal B from the current transformer 66 to the missing filter element predetermined threshold, set by the resistive voltage divider, to determine if the filter element 46 is positioned in the air flow path 26. If the current sensed by the current transformer 66 is greater than the missing filter element predetermined threshold, the comparator 86 turns off and stops the output of the signal at node H to the power switching circuit 90. In response, the triac 92 of the power switching circuit 90 disconnects the motor 30 from the power source 34.

As explained above, a high current value indicates that the filter element 46 is not positioned in the air flow path 26. In the preferred embodiment, the missing filter element predetermined threshold is 3 amps.

The motor 30 and the power source 34 will remain disconnected until the power switching circuit 90 and the missing filter element detector 82 are reset by selection of a switch other than "HI" in the speed selector 50. The closure of one of these other switches outputs a signal to the microprocessor 54 which, in turn, outputs a signal to the comparator 86. This signal resets the comparator 86 so that again allows current flow to pass and outputs the signal H. Signal H from the comparator 86 allows the power switching circuit 90 to be reset. Once the power switching circuit 90 is reset, the motor 30 is again connected to the power source 34 by the triac 92.

Additionally, once a new filter element 46 is in place in the air flow path 26, the density of the filter element 46 increases as the filter element 46 begins to collect particulates. As a result, the air flow from the inlet 18 to the outlet 22 begins to decrease as the filter element 46 filters and collects particulates. Eventually, air flow through the filter element 46 reaches a minimum or stops completely as the filter element 46 becomes clogged. Because there is no air flow in the air flow path 26, the mechanical load on the motor 30 is at a minimum, and the current drawn by the motor 30 is also at a minimum.

Assuming that the speed selector 50 is set to "HI", the comparator 74 of the clogged filter element detector 70 compares the signal B from the current transformer 66 to the clogged filter element predetermined threshold, set by the variable resistor 75, to determine if the filter element 46 is clogged. If the current sensed by the current transformer 66 is less than the clogged filter element predetermined threshold, the comparator 74 allows current to flow through to the transistor 76. As explained above, a low current value indicates that air flow through the filter element 46 and through the air flow path 26 is reduced and that the filter element 46 is clogged.

If the microprocessor 54 has output the signal that the speed selector 50 is set to "HI" to the transistor 76, the transistor 76 will output a signal to the indicator 78. In response, the indicator 78 lights to indicate that the filter element 46 is clogged.

As stated above, in the preferred embodiment, the clogged filter element detector 70, the indicator 78 and the missing filter element detector 82 operate when the speed selector 50 is set to "HI". This is because, when the motor 30 is operating in the "HI" setting, the current drawn by the motor 30 is more consistent and is, therefore, a more reliable indicator for detecting whether the filter element 46 is either clogged or missing. In other embodiments, however, the clogged filter element detector 70, the indicator 78 and the missing filter element detector 82 could operate when the speed selector 50 is set to a setting other than "HI". In these other embodiments, a different type of microprocessor would be provided, or the clogged filter element detector 70 and the missing filter element detector 82 would include additional comparators corresponding to the other settings. These additional comparators would compare the signal B from the current transformer 66, indicative of the current drawn by the motor 30, with a predetermined threshold that represents, in the selected setting, a clogged or a missing filter element condition.

Various features of the invention are set forth in the following claims.

We claim:

1. A method for controlling an air filtering apparatus, the air filtering apparatus including an electric motor adapted to be connected to a power source, and a fan driven by the motor, and the air filtering apparatus employing a selectively removable filter element, said method comprising the steps of:

(a) sensing the current supplied to the motor;
    (b) generating an electrical signal indicative of the current;
    (c) comparing the electrical signal to a predetermined threshold to determine whether the filter element is installed in the air filtering apparatus; and
    (d) disconnecting the motor from the power source in response to said comparison.

2. The method as set forth in claim 1 wherein, during in step (d), the motor is disconnected from the power source if the electrical signal is above the predetermined threshold.

3. The method as set forth in claim 1 wherein the air filtering apparatus further includes a comparator, and wherein step (c) is performed by the comparator.

4. The method as set forth in claim 4 wherein the air filtering apparatus further includes a current transformer, and wherein steps (b) and (c) are performed by the current transformer.

5. The method as set forth in claim 1, and said method further comprising, after step (b), the steps of:

(e) comparing the electrical signal to a second predetermined threshold to determine whether the filter element is clogged; and
    (f) indicating that the filter element is clogged in response to said comparison.

6. The method as set forth in claim 5 wherein the air filtering apparatus further includes a comparator, and wherein step (e) is performed by the comparator.

7. The method as set forth in claim 5 wherein the air filtering apparatus further includes an indicator to indicate when the filter element is clogged, and wherein step (f) further includes operating the indicator if the current supplied to the motor is below the second predetermined threshold.

8. The method as set forth in claim 1 wherein the motor is operable to selectively drive the fan at one of a first operating speed and a second operating speed, and wherein said method further comprises, before step (a), the steps of:

(g) selecting an operating speed for the fan;
    (h) determining if the selected operating speed is the first operating speed; and
    (i) completing steps (a) through (d) only if the selected operating speed is the first operating speed.

9. A method for controlling an air filtering apparatus, the air filtering apparatus including an electric motor adapted to be connected to a power source, a fan which is driven by the motor and which causes an air flow in the air filtering apparatus, and a filter element removably positioned in the air flow so as to filter particulates from the air, the air flow through the device decreasing as the filter element collects particulates, said method comprising the steps of:

(a) sensing the current supplied to the motor;
    (b) generating an electrical signal indicative of the current;
    (c) comparing the electrical signal to a predetermined threshold to determine whether the current supplied to the motor is below the predetermined threshold; and
    (d) indicating that the filter element is clogged if the current supplied to the motor is below the predetermined threshold.

10. The method as set forth in claim 9 wherein the air filtering apparatus further includes an indicator to indicate when the filter element is clogged, and wherein step (d) further includes operating the indicator if the current supplied to the motor is below the predetermined threshold.

11. The method as set forth in claim 9, and said method further comprising, after step (b), the steps of:

(e) comparing the electrical signal to a second predetermined threshold to determine whether the filter element is positioned in the air filtering apparatus; and
    (f) disconnecting the motor from the power source in response to said comparison.

12. The method as set forth in claim 11 wherein, during step (f), the motor is disconnected from the power source if the current supplied to the motor is above the second predetermined threshold.

13. The method as set forth in claim 9 wherein the motor is operable to selectively drive the fan at one of a first operating speed and a second operating speed, and wherein said method further comprises, before step (a), the steps of:

(g) selecting an operating speed for the fan;
    (h) determining if the selected operating speed is the first operating speed; and
    (i) completing steps (a) through (d) only if the selected operating speed is the first operating speed.

14. An air filtering apparatus comprising:

a housing including an inlet and an outlet and defining an air flow path from said inlet to said outlet;
    a motor supported by said housing and adapted to be connected to a power source;
    an air flow producing element driven by said motor to cause an air flow through said air flow path;
    a filter element removably positioned in said air flow path, said filter element, when positioned in said air flow path, filtering particulates from said air flow; and
    a controller circuit including
        a sensing element to sense the current supplied to said motor,
        a comparator connected to said sensing element and for comparing the current to a predetermined threshold and for generating a signal in response to the comparison, and
        a controller connected to said comparator and for disconnecting said motor from the power source if the current sensed by said sensing element is greater than said predetermined threshold.

15. The air filtering apparatus as set forth in claim 14 wherein said sensing element is a current transformer.

16. The air filtering apparatus as set forth in claim 14 wherein said controller circuit further includes a second comparator connected to said sensing element, said second comparator for comparing the current sensed by said sensing element to a second predetermined threshold and for generating a signal in response to said comparison, and
    an indicator connected to said second comparator, said indicator providing an indication that said filter element is clogged when the current sensed by said sensing element is less than said second threshold.

17. The air filtering apparatus as set forth in claim 14 wherein said filter element is a high efficiency particulate air filter element.

18. The air filtering apparatus as set forth in claim 14 wherein-said controller circuit further includes a speed selector element selectively connecting said motor to the power source, said speed selector element for operating said motor to selectively drive said fan at one of a first operating speed and a second operating speed, wherein said speed selector element generates a second signal when said fan is driven at said first operating speed, and wherein said comparator generates said first-mentioned signal in response to the comparison only if said speed selector element generates said second signal.

19. An air filtering apparatus comprising:

a housing including an inlet and an outlet and defining an air flow path from said inlet to said outlet;

a motor supported by said housing and adapted to be connected to a power source;

an air flow producing element driven by said motor to cause an air flow through said air flow path;

a filter element removably positioned in said air flow path, said filter element, when positioned in said air flow path, filtering particulates from said air flow; and a controller circuit including a sensing element to sense the current supplied to said motor, a comparator connected to said sensing element and for comparing the current to a predetermined threshold and for generating a signal in response to the comparison, and an indicator connected to said comparator, said indicator providing an indication that said filter element is clogged when the current sensed by said sensing element is less than said predetermined threshold.

20. The air filtering apparatus as set forth in claim 19 wherein said controller circuit further includes a second comparator connected to said sensing element and for comparing the current sensed by said sensing element to a second predetermined threshold and for generating a signal in response to the comparison, and a controller connected to said second comparator and for disconnecting said motor from the power source if the current sensed by said sensing element is greater than said second predetermined threshold.

* * * * *

UNITED STATES PATENT AND TRADEMARK OFFICE
CERTIFICATE OF CORRECTION

PATENT NO. : 5,810,908
DATED : September 22, 1998
INVENTOR(S) : Edward G. Gray and John W. Seaman It is certified that error appears in the above-indentified patent and that said Letters Patent is hereby corrected as shown below:

Claim 4, Column 7, line 30, "4" should be --1--.

Signed and Sealed this

Sixteenth Day of March, 1999

Attest:

Q. TODD DICKINSON

*Attesting Officer*       *Acting Commissioner of Patents and Trademarks*